May 15, 1945. K. BALLINGER 2,375,754
TRAILER
Filed Nov. 15, 1943 2 Sheets-Sheet 2
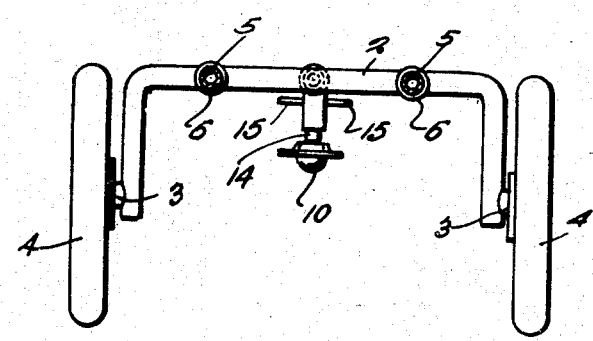
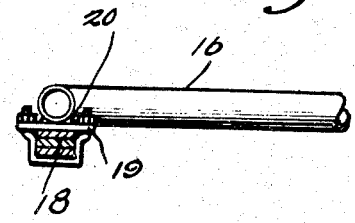
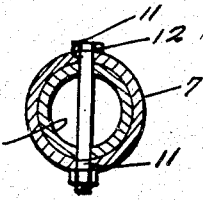
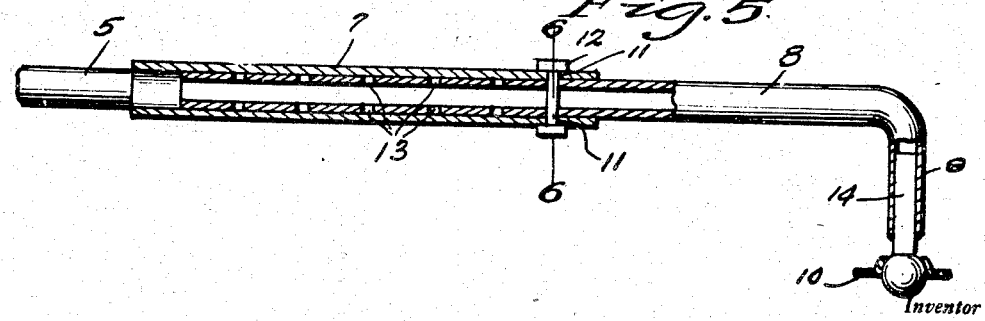
Inventor
KARL BALLINGER
By *Clarence A. O'Brien and Harvey B. Jacobson*
Attorneys Patented May 15, 1945

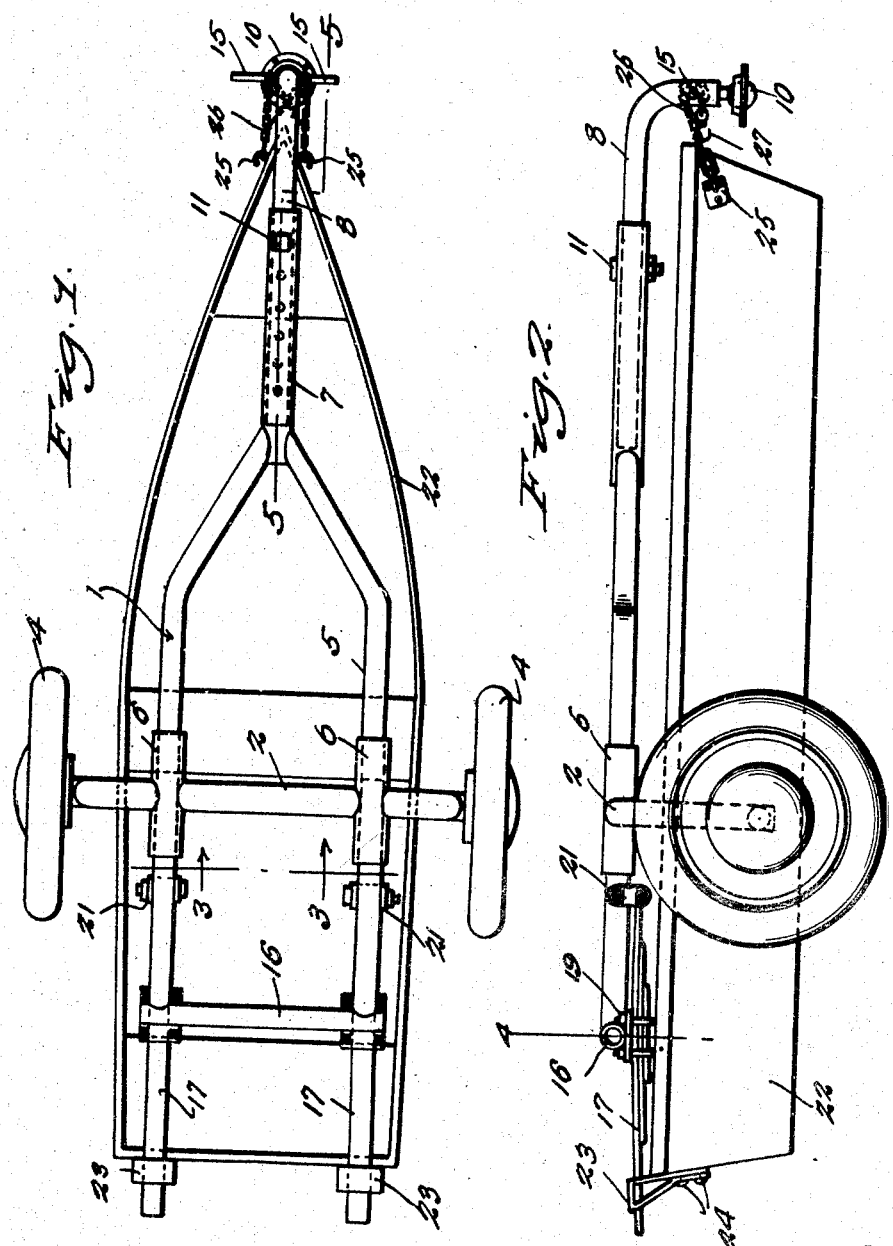

2,375,754

REISSUED

UNITED STATES PATENT OFFICE 2,375,754

TRAILER

Karl Ballinger, Coloma, Mich., assignor of one-third to Foster Krake and one-third to Dorl Sawatzki, both of Coloma, Mich.

Application November 15, 1943, Serial No. 510,348

2 Claims. (Cl. 280—33.4)

My invention relates to improvements in trailers for transporting boats, the principal object in view being to provide a light, strong, automobile trailer for safely transporting small boats, such as flat-bottomed skiffs, and the like, and which when loaded has a low center of gravity so that it will hug the road and not skid from side to side, is easy to load and unload, and adapted for adjustment to transport boats of different sizes.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in top plan of my improved trailer illustrating the manner in which a boat is carried thereby, Figure 2 is a view in side elevation, Figure 3 is a view in transverse section taken on the line 3—3 of Figure 1, Figure 4 is a view in transverse section taken on the line 4—4 of Figure 2 and drawn to an enlarged scale, Figure 5 is a fragmentary view in longitudinal section taken on the line 5—5 of Figure 1 and drawn to an enlarged scale, Figure 6 is a view in transverse section taken on the line 6—6 of Figure 5 and drawn to a further enlarged scale.

Referring to the drawings by numerals, my improved trailer, in its preferred embodiment, comprises as its basic element a chassis frame 1 of suitable tubing and which embodies a transverse, arched center member 2 provided adjacent its ends with a pair of lateral, outstanding spindles 3 for a pair of ground wheels 4 suitably mounted thereon and preferably of the rubber-tired disc type. A pair of side frame members 5 extend through, and are suitably fixed intermediate their ends in a pair of sleeves 6 forming part of the member 2 and located upon opposite sides of the center of said member. The side members 5 converge at their front ends and are suitably joined to the rear end of a front sleeve section 7, also of tubing, and arranged in the longitudinal center of the chassis frame.

A tubular draft tongue 8 is slidably mounted in the sleeve section 7 to extend forwardly therefrom and is provided with a downturned front end 9 equipped with a coupling 10 of any suitable type for coupling the tongue to a tow vehicle, not shown. A pair of opposed upper and lower, vertically aligned bolt holes 11 are provided in the front end of the sleeve section 7 to receive a bolt 12. Longitudinally spaced pairs of bolt holes 13 in the draft tongue 8, for selective extension of the bolt 12 therethrough, provide for adjusting the tongue 8 forwardly and rearwardly in the sleeve section 7 to extend or contract the overall length of the chassis frame. The coupling 10 may comprise a shank 14 suitably fixed in the downturned end 9 of said draft tongue 8. A pair of studs 15 extend laterally from the downturned end 9 of said tongue 8, upon opposite sides of the tongue, and form a cleat for a purpose presently seen.

A cross member 16 connects the rear ends of the side members 5, as best shown in Figure 1. A pair of cantilever springs 17 are secured to said cross member 16 by central spring clips 19 welded, as at 20, to said cross member 16, the front ends of the springs 17 being connected to the side members 5 by shackles 21, and said springs extending rearwardly from said side members 5 in alignment therewith.

The boat 22, according to my invention, is suspended from the springs 17 and the studs 15 as follows:

A pair of skeleton, flat, metal hangers 23 are suitably secured, as at 24, to the stern of the boat, adjacent opposite sides thereof, to extend above the stern and through which the rear ends of the springs 17 are suitably extended, it being understood that said hangers are removable from said springs when desired. A pair of hook members 25 are provided on the prow of the boat 22 upon opposite sides of the same. A pair of chains 26 are attached each at one end thereof to one of said hook members 25, extended forwardly around the studs 15, respectively, and then extended rearwardly and crossed with their other ends attached to links of said chains by terminal hooks 27 on said other ends thereof.

As will now be seen, my improved trailer provides for carrying the boat in underslung position relative to the frame 1 so that the center of gravity is low and the trailer will not skid from side to side or easily turn over. Also, the boat is spring-suspended so as to minimize shock and jar, the frame 1 may be extended, in the manner already described, for carrying boats of different lengths and the entire vehicle may be inexpensively constructed for the most part of stock tubing to provide for lightness in weight without sacrificing strength and durability.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a trailer for transporting a boat and coupling to a tow vehicle, a chassis frame comprising a pair of side members, a transverse arch member supporting said side members in substantially the transverse center thereof, a pair of ground wheels supporting said arch member, a tubular front end section to which the front ends of said side members are joined, a draft tongue extending from said section and adjustable therein to extend the overall length of said frame, and means to suspend a boat from said tongue and the rear ends of the side members with said arch member straddling the boat comprising a pair of cantilever springs extending rearwardly from the rear ends of said side members and having free rear ends, and hangers for attaching one end of the boat to the rear ends of said springs and through which said free ends of said springs extend.

2. In a trailer for transporting a boat and coupling to a tow vehicle, a chassis frame comprising a pair of side members, a transverse arch member supporting said side members in substantially the transverse center thereof, a pair of ground wheels supporting said arch member, a tubular front end section to which the front ends of said side members are joined, a draft tongue extending from said section and adjustable therein to extend the overall length of said frame, and means to suspend a boat from said tongue and the rear ends of the side members with said arch member straddling the boat, comprising a pair of cantilever springs extending rearwardly from the rear ends of said side members, hangers for attaching one end of the boat to the rear ends of said springs and through which said springs extend, a pair of hook members for attachment to the other end of said boat upon opposite sides thereof, and chains for connecting said hooks to said tongue.

KARL BALLINGER.